United States Patent [19]
Peck et al.

[11] 4,048,440
[45] Sept. 13, 1977

[54] ASYNCHRONOUS-TO-SYNCHRONOUS DATA CONCENTRATION SYSTEM

[75] Inventors: Richard John Peck, Eatontown; Shih Yung Tong, Holmdel, both of N.J.

[73] Assignee: Bell Telephone Laboratories, Incorporated, Murray Hill, N.J.

[21] Appl. No.: 739,803

[22] Filed: Nov. 8, 1976

[51] Int. Cl.² .......................................... H04L 7/00
[52] U.S. Cl. .......................... 178/69.1; 178/53.1 R; 179/15 AF
[58] Field of Search .................. 178/53, 53.1 R, 69.1, 178/66, 68, 88; 179/15 AF, 15 BS, 2 DP; 343/175, 179

[56] References Cited
U.S. PATENT DOCUMENTS

| | | | |
|---|---|---|---|
| 3,937,882 | 2/1976 | Bingham | 178/69.1 |
| 4,002,844 | 1/1977 | Doussoux | 179/15 AF |

*Primary Examiner*—Thomas A. Robinson
*Attorney, Agent, or Firm*—Joseph P. Kearns

[57] ABSTRACT

Asynchronous character-oriented (start-stop) data are transmitted through a synchronous transmission channel at a rate which can exceed the synchronous rate. The excess data rate is accomplished in an input buffer at the transmitter by suppressing occasional stop bits in proportion to the difference between synchronous and asynchronous rates. An output buffer at the receiver detects start bits and thereafter monitors the presence or absence of stop bits. When a stop bit is absent, the output buffer restores it before delivering the character to the data user.

Special control signals not organized into characters, such as, all-space signals are also monitored at both transmitter and receiver to insure that stop bits are not spuriously inserted.

5 Claims, 2 Drawing Figures

ASYNCHRONOUS-TO-SYNCHRONOUS DATA CONCENTRATION SYSTEM

FIELD OF THE INVENTION

This invention relates to data conversion systems, specifically to the buffering and reconstruction of asynchronous data characters on synchronous transmission channels.

BACKGROUND OF THE INVENTION

Serial digital data transmission is broadly divided between two classes: asynchronous and synchronous. Asynchronous transmission occurs when the intervals between input data transitions are nonuniform and independent of assigned channel timing characteristics. Synchronous transmission occurs when the intervals between data transitions are made uniform in accordance with assigned timing parameters. With asynchronous transmission the data transmission system adapts itself to the data. With synchronous transmission the data must be in a form compatible with fixed timing characteristics. Typical of asynchronous data is that generated by facsimile or other scanning apparatus. Asynchronous transmission is principally used at relatively low speeds, perhaps up to 1800 bits per second on voiceband channels.

Synchronous data is principally generated in data processors and may run into the thousands of serial bits per second in voiceband channels.

An intermediate type of data transmission is carried over from the Baudot code of printing telegraphy. Data are transmitted by character in the Baudot code, which uses five parallel hole positions on a tape to encode alphanumeric symbols. The code is transmitted serially with a start bit of fixed transition direction preceding each group of five message bits and a stop bit of oppositely directed transition. Modernization of the Baudot code has resulted in the nine-bit Extended Binary Coded Decimal Interchange Code (EBCDIC) and the ten-bit American Standard Code for Information Interchange (ASCII) codes. The additional bits make it possible to increase the number of available symbols in the code and to supply error-detecting parity bits. The newer codes include start and stop bits and are described generically as character asynchronous, that is, the time interval between characters is variable. However, the interval between bits within a character is largely synchronous, but not necessarily at the same rate as that of the transmission system.

It is an object of this invention to adapt the character-asynchronous data code format to the fully synchronous data transmission channel.

It is another object of this invention to provide a buffer between a character-asynchronous data format and a synchronous data transmission channel in such a way that the effective maximum input date rate can be exceeded by a moderate amount the synchronous channel data rate.

It is still another object of this invention to provide buffers between a character-asynchronous data format and a synchronous data transmission channel which adds or eliminates stop bits at the transmitter and restores a missing stop bit when necessary at the receiver to accommodate an input bit rate somewhat in excess of the synchronous rate.

It is yet another object of this invention to stretch steady space signals exceeding a character length to at least two character lengths without an intervening stop bit.

SUMMARY OF THE INVENTION

In accordance with this invention, in an input buffer at the transmitter, character-oriented serial data bit streams are continuously monitored for the occurrence of start bit transitions, responsive to such transitions and at a phase determined by their occurrence each character is first sampled at the synchronous data rate over its fixed length and thereafter each character is resampled at the synchronous data rate but at the constant phase assigned to the transmission channel before being modulated onto the channel; and in an output buffer at the receiver the incoming serial data stream after demodulation is monitored for the occurrence of start bit transitions, responsive to such transitions and at a phase determined by their occurrence each character is first sampled at a rate higher than the synchronous data rate over a character length, thereafter each character is resampled at another rate slower than that at which the first sampling took place, consecutive received characters are monitored for the presence or absence of a stop bit, and stop bits are reinserted where missing or foreshortened.

The input and output buffers permit the intracharacter bit rate to exceed the synchronous rate by a small amount up to the order of one percent. Incoming characters whose intracharacter bit rate exceeds the synchronous rate, when sampled at the synchronous rate, are sampled increasingly late in succeeding bits until one whole bit is missed. All message bits, as well as the start bit, occupy identical time intervals and the compensation occurs by foreshortening the stop bit. When characters occur continuously at an intracharacter bit rate above the synchronous rate, an occasional stop bit can be lost altogether. For a one percent continuous overspeed one stop bit would be lost in ten ASCII characters.

Sampling in the output buffer is performed at a higher rate than that at the input buffers so that the occasional stop bit lost in transmission can be reinserted at the receiver.

A special feature of the invention takes into consideration the use by some data terminals of a steady space signal as an interrupt or "break" command, which is normally somewhat longer than two character lengths. A break extender and a break detector can be incorporated in the respective input and output buffers to force break intervals to be at least two characters in length and thereby avoid faulty insertion of a stop bit in a command signal.

In the illustrative data concentration and conversion system it is assumed that the synchronous serial transmission rate assigned to the transmission channel is 1200 bits per second. The ASCII start-stop character is ten bits long, including a start bit, a stop bit and eight data bits. The EBCDIC start-stop character is nine bits long, including a start bit, a stop bit and seven data bits. Other characters with differing numbers of data bits can readily be accommodated. Marking (1) bits are low level and spacing (0) bits are high level, in accordance with the negative logic convention. Start bits and break bits are low level and consequently are introduced by negativegoing transitions. Stop bits are high level. Data bits are high or low, depending on content. A typical start-stop character 40 is shown in FIG. 1.

BRIEF DESCRIPTION OF THE DRAWING

The objects and features of this invention will become more apparent from a consideration of the following detailed description and the drawing in which.

DESCRIPTION OF THE ILLUSTRATIVE EMBODIMENT

Figure 1:
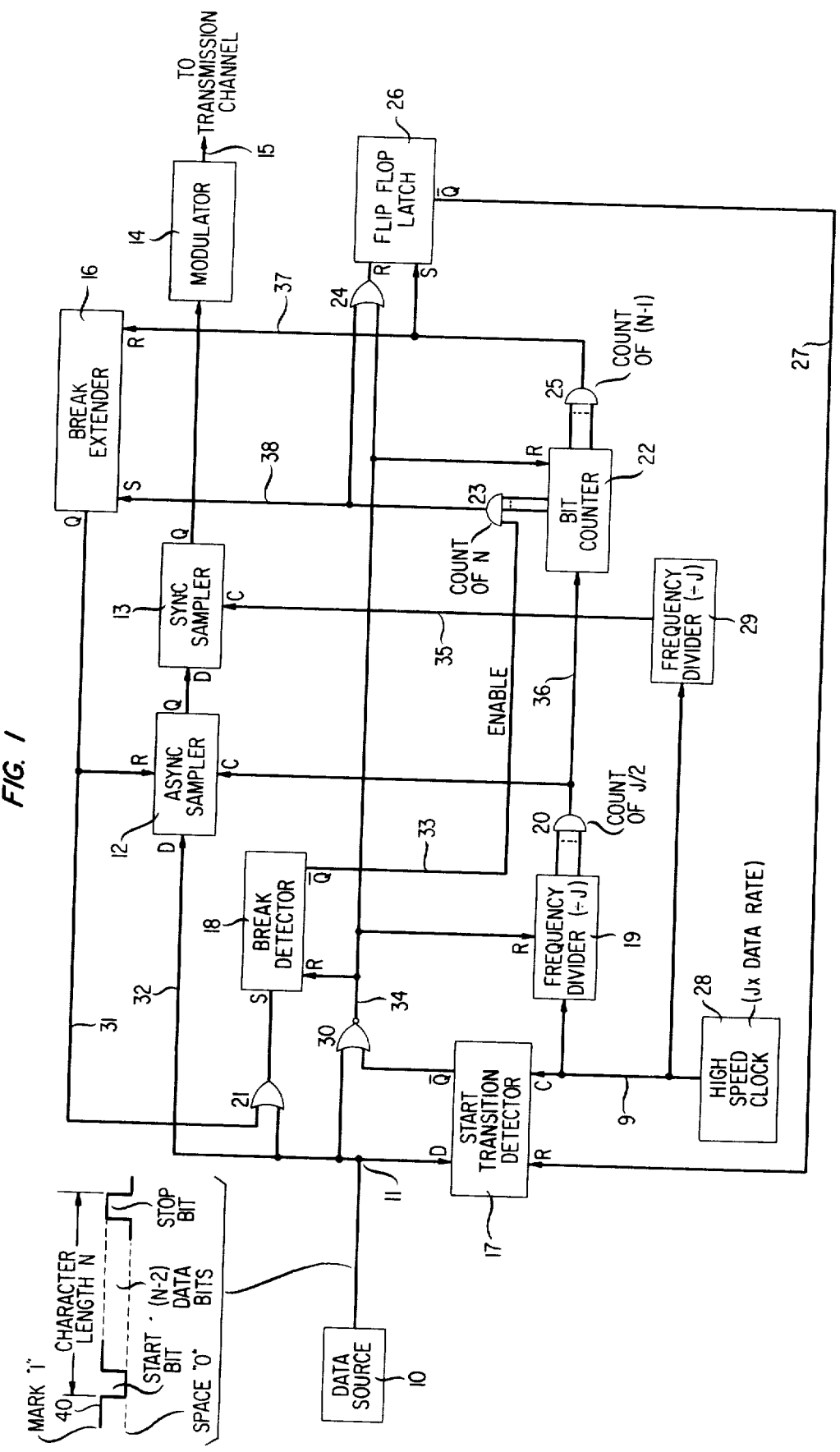
FIG. 1 is a simplified block diagram of a transmitter for a synchronous data transmission system including an input buffer for concentration and conversion of character-oriented data whose data rate can slightly exceed the synchronous data transmission rate according to this invention.
Figure 2:
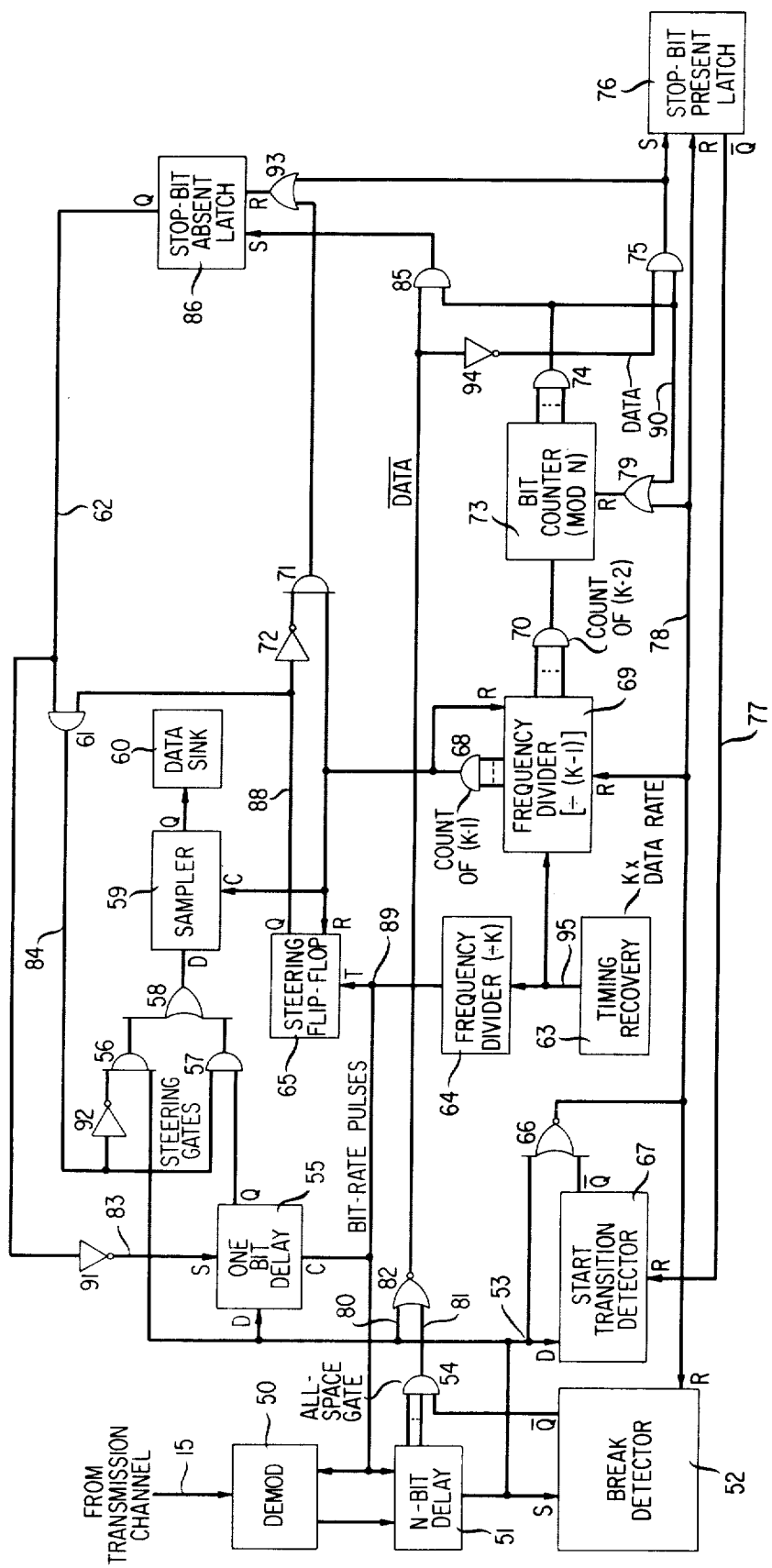
FIG. 2 is a simplified block diagram of a receiver for a synchronous data transmission system incorporating the transmitter of FIG. 1, which receiver includes an output buffer for reconverting concentrated character-oriented data with missing stop bits into full characters according to this invention.

FIGS. 1 and 2 represent respectively the transmitter and receiver terminals of a synchronous digital data transmission system using an analog transmission channel, such as a telephone voiceband channel. FIGS. 1 and 2 incorporate respectively input and output buffers to accommodate a fully synchronous transmission channel to start-stop characters having irregular intercharacter intervals, but largely synchronous intracharacter intervals. The input and output buffers allow the intracharacter intervals to vary from the synchronous rate within bounds, such as +1.25%, −2.5%, of a nominal 1200 BPS. When the intracharacter rate exceeds the synchronous rate, the stop bit is adjusted in length to permit sustained overspeed transmission of a continuous stream of characters.

FIG. 1 represents the transmitter terminal of a synchronous data transmission system, which includes an input buffer for a synchronous character-oriented input signals. The transmitter terminal of FIG. 1 comprises baseband digital data source 10, high-speed clock 28, freerunning frequency divider 29, resettable frequency divider 19, start transition detector 17, bit counter 22, latch 26, a synchronous sampler 12, synchronous sampler 13, break extender 16, break detector 18 and modulator 14. The output of modifier 14 can be delivered to analog transmission channel 15 as a phase-shift keyed (PSK) signal, for example.

Data source 10 accepts data from a customer's business machine at a nominal 1200 BPS rate. Modulator 14 typically phase shift modulates a 1200 Hz sinusoidal carrier as four discrete phase changes at a baud rate of 600. Data source 10 and modulator 14 are conventional in structure and operation.

Serial data not organized into characters proceed from source 10 to modulator 14 through a synchronous sampler 12 and synchronous sampler 13. In point of fact a synchronous sampler 12 is redundant for continuous data. Both samplers are driven from high speed clock 28, operating typically at J=16 times the synchronous data rate, illustratively 1200 BPS, to cause sampling to occur at the synchronous rate. A synchronous sampler 12 differs from synchronous sampler 13 only in being variable in phase. For continuous data the phases of both samplers are identical. When continuous data are used, start detector 17, break detector 18 and break extender 16 are deactivated.

Character-oriented data, however, activate start transition detector 17, which can be implemented by a D-type flip-flop whose output Q follows the state of data input D in coincidence with clock inputs C. (Output $\bar{Q}$ is the complement of output Q.) Set S and reset R inputs, if activated, shift the output Q to a respective high or low state independently of the clock input. Clock input C of start detector 17 is provided at sixteen-times data rate from clock 28. Thus, the output state $\bar{Q}$ of detector can be changed at sixteen discrete phases with respect to the synchronous data rate. The presence of NOR-gate 30, with inputs from the data stream and the $\bar{Q}$ output, produces a momentary spike when the starting transition occurs. When the $\bar{Q}$ output of detector 17 causes NOR-gate 30 to go momentarily high on lead 34, frequency divider 19, break detector 18 and bit counter 22 are reset to the all-zero state, and flip-flop latch 26 is reset to provide a high output on its output $\bar{Q}$ on lead 27. The high-level signal on lead 27 resets detector 17 to a state which effectively prevents it from responding to start transitions for the length of a character.

Frequency divider 19 counts down the output of high-speed clock 28 to the synchronous rate. Effectively divider 19 provides J changes of state for each synchronous interval. AND-gate 20 is connected to the several countdown stages of divider 19 so that at the recurring count of J/2 it provides a sampling pulse to a synchronous sampler 12 which occurs near the centers of the intracharacter bits. A binary countdown of sixteen is realizable, as is well known, by four shift register sections. The count of eight (16/2) is reached from an all-zero reference when the output of the highest order stage is one and the outputs of the remaining stages are zero. Therefore, a synchronous sampler 12 samples each data bit in a message character substantially at its center and the Q output of sampler 12 follows the binary state of the D input.

At the same time the center count output of gate 20 is applied to bit counter 22 over lead 36. Bit counter 22 counts from zero (since it was reset by the recognition of a start bit by detector 17) to one less than the number of bits N in a character. An ASCII character, for example, has ten bits, including the start and stop bits. Therefore, for an ASCII character AND-gate 25 is connected to the countdown stages of counter 22 to produce a coincidence output on the count of nine. This end-of-character count marks the position of the stop bit and is used to set flip-flop latch 26 to the state where the $\bar{Q}$ output is low on lead 27, thus releasing the clamp on start-bit character 17. Detector 17 is now free to respond to the next start bit.

It is to be noted that latch 26 is released at the end of the character count at the synchronous rate independently of the intracharacter bit rate of the character being transmitted. Should the incoming character bit rate exceed the synchronous rate the stop bit is sampled in the last half of its interval and persists until the next start transition occurs and consequently varies in length. Thus, the discrepancy between an excessive incoming bit rate and the synchronous bit rate is compensated by a foreshortening of the stop bit. Since the stop bit is the only bit permitted to be shorter than 1/1200 second, synchronous sampler 13 can conceivably fail to sample it. A stop bit can thus be stripped from a character.

The character-oriented data sampled in a phase determined by the occurrence of the start bit in a synchronous sampler 12 is retimed to the phase of the transmission channel in synchronous sampler 13 under the timing control of free-running clock 28 through frequency divider 29, whose division rate is also J. For the described embodiment J = 16.

The transmitter of FIG. 1 also provides for those start-stop systems which use a steady space signal as an interrupt or break command. A full break with the nine-bit (N=9) code is minimally 9 bits and with a ten-bit (N=10) code is at least 10 bits in length. Furthermore, there is a delete character coded by ASCII as a start bit followed by eight space bits and a marking stop bit.

In order to make it possible to distinguish between a delete code and a break code at the receiver output buffer, break extender 16 is incorporated in the input buffer of FIG. 1.

AND-gate 23 is connected to bit counter 22 to monitor counts of N = 10 (for the ASCII code) or N = 9 (for the EBCDIC code). The break is extended to 24 or 25 bits for the ASCII code and to 21 or 22 bits for the EBCDIC code.

Break detector 18 is a resettable flip-flop which continually monitors the presence of stop bits in the baseband data stream from data source 10. Its S input is connected through OR-gate 21 to date junction 11. Thus, the Q output goes low when a stop bit occurs and thereby inhibits AND-gate 23 from reaching the count of N to set break extender 16. Its R input is connected to reset lead 34 from start transition detector 17. Thus, AND-gate 23 is enabled each time a character is presented and will remain enabled unless a stop bit occurs.

At the same time that AND-gate 23 reaches the count of N, its output resets latch 26 through OR-gate 24 to inhibit start detector 17 from responding to start transitions and resetting break detector 18. When break extender 16 is set over lead 38 from AND-gate 23, its Q output goes high and resets a synchronous sampler 12 to provide a spacing output to synchronous sampler 13. Break detector 18 is set over lead 31 and OR-gate 21 to disable AND-gate 23. The spacing signal is generated by sampler 12 until break extender 16 is reset on the next count of (N−1), which also activates AND-gate 25. Start detector 17 is also reset to renew its search for start transitions.

There is a slight disadvantage when data is transmitted during the extended break period in that start detector 17 can respond to a message bit as a start bit at the end of the extended break and missynchronize. One or two characters may be in error until synchronism is regained.

FIG. 2 represents the receiver terminal of a synchronous data transmission system, which includes an output buffer for a synchronous character-oriented received signals. The receiver terminal of FIG. 2 comprises demodulator 50, delay unit 51, start transition detector 67, high-speed clock 63, frequency dividers 64 and 69, bit-rate counter 73, stop-bit present latch 76, break detector 52, steering gates 56 through 58, steering flip-flop 65, sampler 59, stop-bit absent latch 86, and data sink 60.

The receiving terminal of FIG. 2 is controlled by timing recovery 63, which is an integer K times the receive timing signal. The output of frequency divider 64 is precisely the synchronous sampling rate. Where the illustrative multiple of J=16 was chosen at the transmitting terminal, a higher precision of control is achieved at the receiving terminal by adopting a multiple of K=64. Accordingly, for illustrative purposes, high-speed clock 63 has the rate of 64 times the data rate.

Timing recovery 63 and its frequency divider 64 can advantageously be implemented by the timing recovery arrangement of the copending patent application of Richard John Peck, Ser. No. 626,658 filed Oct. 29, 1975, now U.S. Pat. No. 4,010,323; issued Mar. 1, 1977.

Incoming passband signals are first demodulated to baseband in demodulator 50 and appear at junction 53 after passing through N−bit (N=bits per character) delay unit 51.

If continuous serial synchronous data were being received, start detector 67, latches 76 and 86 and break detector 52 would be effectively switched out of the circuit. Baseband data would be routed through AND-gate 56 and OR-gate 58 to sampler 59, which is clocked at the substantially K-divided rate of clock 63. The Q output of sampler 59 is delivered to data sink 60 for final processing by the data customer.

When character-oriented data are received at junction 53, start detector 67 monitors for the first negative-going transition, on the occurrence of which its $\bar{Q}$ output goes high and through NOR-gate 66 with one data input and the $\bar{Q}$ output provides a spike to reset frequency divider 69 and bit counter 73 to the zero state over lead 78, and further resets stop-bit present flip-flop latch 76 to a high $\bar{Q}$ output state. The $\bar{Q}$ output over lead 77 resets start detector 67 to a state which prevents it from responding to further negative transitions in the incoming signals.

The effective sampling rate in the receiver is increased to a rate slightly above the synchronous rate by picking off the sampling pulse from the divide-by-(K−1) frequency divider 69 one bit early, thereby effectively making the sampling rate K/(K−1) times the synchronous rate. In the illustrative example the sampling rate becomes 64/63 of the synchronous rate or 1219 Hz at junction 89. Frequency divider 69 is reset to zero on the 63rd count, as indicated.

To prevent a race situation bit counter 73 is connected to frequency divider 69 through AND-gate 70, which is programmed to fire one count before the sampling pulse at the count of K−2. Bit counter 73 has connected to its countdown stages AND-gate 74 to produce an end-of-character count (N) coincident with the anticipated position of the stop bit. The end-of-character count is applied to AND-gates 75 and 85. AND-gate 75 controls stop-bit present latch 76 and AND-gate 85 controls stop-bit absent latch 86. Latch 76 operates in substantially the same mannner as latch 26 in FIG. 1 to determine the period during which the start-bit detector 67 can respond to start transitions.

Stop-bit present latch 76 and stop-bit absent latch 86 are further controlled by the state of N-bit delay unit 51 and break detector 52. N-bit delay unit 51 effectively stores one complete character. Each data character normally includes one spacing start bit and at least one marking stop bit. The break character is an allspace character extending over at least 2N bits. When allspace AND-gate 54 connected to the interstage points of delay unit 51 and the $\bar{Q}$ output of break detector 52 are high, its output is held low for both the idle condition and the normal character condition. However, whenever the allspace character is present, the output of gate 54 goes high.

The output of gate 54 is connected to NOR-gate 82 over lead 81. The other input of NOR-gate 82 is supplied with the delayed data appearing at junction 53. By the operating rule for a NOR-gate when one input is held low the output is the inverse of the other input.

Thus, the output of gate 82 is normally the complemented data. Conversely, when the all space gate goes high to indicate that two allspace characters occur in tandem, the output of gate 82 is held low independently of the data input.

At the end-of-character count the data lead should be high when the stop bit is present. In this condition AND-gate 75 goes to the high-output state and sets stop-bit present latch 76 and resets stop-bit absent latch 86 through OR-gate 93. The incoming data are steered directly through AND-gate 56 and OR-gate 58 to sampler 59.

When a single stop bit is absent, however, the complemented data input to AND-gate 85 is high in coincidence with the end-of-character count from AND-gate 74 and AND-gate 85 goes high to set stop-bit absent latch 86. The high Q output of latch 86 on lead 62 is applied through AND-gate 61 to steering gates 56 (through inverter 92) and 57, whereby gate 56 is disabled and gate 57 is enabled. The high Q output standing on the S input of delay unit 55 has held the Q output high. Consequently, a stop bit is forced onto sampler 59 as a path is completed for incoming data to traverse one-bit delay unit 55 before being applied through AND-gate 57 and OR-gate 58 to sampler 59.

One-bit delay unit 55 can be readily implemented by a D-type flip-flop, which is reset by the latch pulse from latch 86 as previously mentioned. The Q output of delay unit 55 goes high and effectively causes a stop bit to be inserted initially in the data train going to sampler 59. Thereafter, delayed data are supplied to sampler 59 until a double sample of a given data bit occurs. At that time steering flip-flop 65 restores the original state of steering gates 56 and 57 to remove delay unit 55 from the data path.

By way of further explanation of how speeded-up sampling is reconciled with synchronous sampling other than at the position of the stop bit, it is to be noted that samples of received data are taken under the timing control of frequency divider 69, which effectively takes 64/63 × 1200 = 1219 samples per second. A synchronous data bit spans an interval measured by 64 synchronous clock pulses. However, gate 68 provides a sampling output every 63 clock pulses to sampler 59. Accordingly, the first start bit of a succession of back-to-back synchronous characters is sampled one clock pulse from its termination. The next bit is sampled two clock pulses from its termination, and so forth. The 64th pulse, however, would be sampled twice if this condition is not prevented.

Demodulation data from demodulator 50 are shifted into N-bit delay register 51 at the recovered synchronous rate provided from junction 89 at the output of frequency divider 64. Steering flip-flop 65 is toggled at the synchronous rate. Its Q output goes high at the beginning of each synchronous sampling interval and enables AND-gate 61 over lead 88. When the stop bit is absent, as indicated by a high output on NOR-gate 82, stop-bit absent latch 86 generates a high output on lead 62 which is applied to another input of AND-gate 61. Thus steering gate 56 is enabled to provide a path for received signals through delay register 55, AND-gate 57 and OR-gate 58 to sampler 59. The sampling clock from AND-gate 68, occurring every 63 timing recovery pulses, samples the data and also resets steering flip-flop 65 to the low-output state. Steering gates 56 and 57 are returned to their original states and delay unit 55 is removed from the circuit.

When the speeded-up sampling rate from AND-gate 68 is in the condition where two samples would be taken, delay unit 55 is switched into the data path and the first sample taken is that of the delayed incoming signal.

Immediately thereafter steering flip-flop 65 is reset before the next sampling pulse can be applied to the delayed bit. Instead the next undelayed data bit is steered to sampler 59 before the second sampling pulse occurs. The second sampling pulse thus actually samples the next data bit. The stop-bit absent latch is also reset from the output of gate 68 by way of AND-gate 71, itself enabled by the output of steering flip-flop 65 after inversion is inverter 72 through OR-gate 93. Thereafter, only undelayed input signals are sampled until either a stop bit is missed at the end of a character instant measured by bit counter 63 or an intracharacter bit is about to be sampled twice.

When an extended break signal is received, no stop bit occurs for at least two character lengths. Bit counter 73 counts modulo-N by reason of a reset connection between AND-gate 74 and its R input by way of OR-gate 79. The occurrence of a marking signal is monitored by flip-flop 52, which is set every time a marking data bit, including a stop bit occurs. The $\overline{Q}$ output is therefore normally low and keeps all-space gate 54 disabled. However, flip-flop 52 is reset at the beginning of each character by the reset input on lead 78 from the output of start detector 67. When no stop bit occurs and there are no marking bits in the character stored in delay unit 51, there is an indication that a break signal is being received. All-space gate 54 forces the output of NOR-gate 82 into its low state and no stop bit is reinserted into the break signal. At the same time stop-bit present latch 76 is set through AND gate 75 and the clamp on start detector 67 is released.

While this invention has been disclosed in the form of a specific illustrative embodiment, it is to be understood that the arrangement is susceptible of extensive modification within the spirit and scope of the following claims.

What is claimed is:

1. In a synchronous digital data transmission system, including a transmission line between system terminals, converters for data characters having start and stop bits and a fixed number of data bits comprising at a transmitter for one terminal of said transmission line;

first means responsive to a start-bit transition for synchronously sampling the bits in a character at a phase determined by that of said start bit, first latching means for inhibiting character bits from said first sampling means for one character length, second sampling means for retiming character bits from said first sampling means according to the substantially constant phase of the synchronous timing assigned to said transmission line, and means for applying retimed character bits to said transmission line; and at a receiver for another terminal of said transmission line;

means for accepting data signals from said transmission line, second means responsive to a start-bit transition for sampling the bits in a character at a phase determined by that of said start bit but at a rate higher than said synchronous rate, second latching means for inhibiting character bits from said first sampling means for one character length storage means traversed by received data signals having at least as many storage positions as there are bits in each character, means for monitoring the storage positions in said storage means having one binary output when all positions are opposite in binary sense to a stop bit and the other binary output otherwise, third latching means responsive to the output of said monitoring means for producing a control output when said monitoring means output indicates the absence of a stop bit, third sampling means for retiming received character bits, one-bit delay means, and a pair of steering gates responsive to the control output of said third latching means alternatively providing a direct path or a path through said one-bit delay means for received signals to said third sampling means in accordance with the presence or absence of a stop bit, a missing stop bit being reinserted thereby.

2. In the converters for start-stop data characters defined in claim 1, at the transmitter a break extender for continuous signals of longer than character length having a binary sense complementary to that assigned to a stop bit comprising a break detector assuming one binary state responsive to a character bit of the same binary sense as said stop bit and the other binary state responsive to the presence of said start bit, a counter responsive to said first synchronous sampling means for providing a first output at a count level equal to one character length, and means jointly responsive to the output state of said break detector indicating the absence of a stop bit and the output of said counter for switching said first sampling means to the binary state complementary to that assigned to a stop bit for the duration of an additional character length; and at the receiver means for inhibiting said third latching means in response to the failure of a stop bit to occur between two successive start bits.

3. In a synchronous digital data transmission system, including a synchronously timed transmission line between system terminals, means at a transmitting terminal for said system for conditioning synchronously occurring characters of fixed length with standardized start and stop framing bits for application to said transmission line at the synchronous timing rate comprising timing means for providing a pulsed output at an integral number of times the synchronous data rate, detector means jointly responsive to the output of said timing means and to the start framing bit transition at the beginning of each character for providing a control output, first frequency-dividing means driven by said timing means and said control output for reducing the rate of the pulsed output of said timing means to the synchronous data rate at the phase of said control output, first sampling means controlled by said first frequency-dividing means for bits within each character, second frequency-dividing means driven by said timing means for reducing the rate of the pulsed output of said timing means to the synchronous data rate at the constant phase assigned to said transmission line, second sampling means for retiming the character bits sampled by said first sampling means to be synchronous in phase and frequency with synchronous transmission line timing, bit-counter means driven by the output of said first frequency-dividing means for providing an end-of-character output at the expected time of occurrence of the stop bit in each character, and latching means set by the output of said bit-counter means for disabling said detector means in the period between start and stop bits in each character.

4. In a synchronous digital data transmission system including a synchronous transmission line between system terminals, means at a receiving terminal for said system for restructuring a synchronously occurring characters of fixed length with standardized start and stop framing bits incoming on said transmission line, some of which characters have missing stop bits comprising storage means having at least as many storage cells as there are bits in each data character, means for applying received signals to said storage means, gate means controlled by the totality of bit samples contained in said storage means at a given instant for producing complementary binary outputs according to whether or not one input possesses the binary sense of a stop bit, timing means providing a pulsed output at an integral number of times the synchronous data rate assigned to said transmission line, detector means jointly responsive to the output of said timing means and to the start framing bit transition at the beginning of each character for providing a control output, first frequency dividing means driven by said timing means and said control output for reducing the rate of the pulsed output of said timing means to a sampling rate faster than the synchronous data rate at the initial phase of said control output, second frequency-dividing means driven by said timing means for reducing the rate of the pulsed output of said timing means to the synchronous rate assigned to said transmission line, bit counter means driven by the output of said first frequency dividing means for providing an end-of-character output at the expected time of occurrence of the stop bit in each character, sampling means controlled by the faster-than-synchronous output of said first frequency-dividing means for data traversing said storage means, one bit delay means, and first and second latching means responsive to the end-of-character output of said bit-counter means settable in the alternative according to whether the stop bit is present or absent, the output of said first latching means indicating the presence of stop bit for disabling said detector means in the period between start and stop bits and the output of said second latching means indicating the absence of a stop bit for connecting said one-bit delay means in a circuit path between said storage means and said sampling means.

5. The synchronous digital data transmission system defined in claim 4 in which said receiving terminal includes means for preventing double sampling of a single character bit comprising steering flip-flop means responsive to the synchronous timing output of said second frequency dividing means to provide an enabling signal for the connection of said one-bit delay means in the circuit path between said storage means and said sampling means and responsive to the faster-than-synchronous output of said first frequency dividing means to remove said one-bit delay means from said circuit whenever more than one sampling pulse is generated between synchronous instants.

* * * * *